(12) United States Patent
Sun et al.

(10) Patent No.: US 11,805,049 B2
(45) Date of Patent: Oct. 31, 2023

(54) COMMUNICATION METHOD AND COMMUNICATIONS DEVICE

(71) Applicant: Huawei Technologies Co., Ltd., Shenzhen (CN)

(72) Inventors: Chunxia Sun, Beijing (CN); Yaokun Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 223 days.

(21) Appl. No.: 17/186,776

(22) Filed: Feb. 26, 2021

(65) Prior Publication Data

US 2021/0184963 A1 Jun. 17, 2021

Related U.S. Application Data

(63) Continuation of application No. PCT/CN2019/102898, filed on Aug. 27, 2019.

(30) Foreign Application Priority Data

Aug. 30, 2018 (CN) .......................... 201811005412.9

(51) Int. Cl.
*H04L 45/24* (2022.01)
*H04L 45/02* (2022.01)
*H04L 45/745* (2022.01)

(52) U.S. Cl.
CPC .............. *H04L 45/24* (2013.01); *H04L 45/04* (2013.01); *H04L 45/745* (2013.01)

(58) Field of Classification Search
None
See application file for complete search history.

(56) References Cited

U.S. PATENT DOCUMENTS

| 8,670,320 | B2* | 3/2014 | Eswaran ................. H04L 45/54 |
| | | | 370/401 |
| 9,106,530 | B1 | 8/2015 | Wang |
| 2007/0250612 | A1 | 10/2007 | Elias et al. |
| 2009/0296714 | A1 | 12/2009 | Gerber et al. |
| 2011/0310903 | A1* | 12/2011 | Tu ......................... H04L 45/586 |
| | | | 370/392 |

(Continued)

FOREIGN PATENT DOCUMENTS

| CN | 101340372 A | 1/2009 |
| CN | 101605087 A | 12/2009 |

(Continued)

OTHER PUBLICATIONS

Marques, P. et al., "Constrained Route Distribution for Border Gateway Protocol/MultiProtocol Label Switching (BGP/MPLS) Internet Protocol (IP) Virtual Private Networks (VPNs)", RFC 4684, Nov. 2006, 14 pages.

*Primary Examiner* — Xavier S Wong
(74) *Attorney, Agent, or Firm* — Slater Matsil, LLP

(57) ABSTRACT

A communication method and a communications device are provided. The communication method includes: a first device receives a first BGP update packet from a second device. The first BGP update packet includes a route target and a first address family identifier. The first device determines a first route associated with the route target and the first address family identifier. The first device sends the first route to the second device.

14 Claims, 5 Drawing Sheets

(56) References Cited

U.S. PATENT DOCUMENTS

2013/0031271 A1* 1/2013 Bosch ................. H04W 84/042
709/245
2015/0381493 A1 12/2015 Bansal et al.
2018/0287929 A1* 10/2018 Means .................... H04L 45/02

FOREIGN PATENT DOCUMENTS

| | | |
|---|---|---|
| CN | 101674245 A | 3/2010 |
| CN | 102217254 A | 10/2011 |
| CN | 102724117 A | 10/2012 |
| CN | 102724118 A | 10/2012 |
| CN | 102804693 A | 11/2012 |
| CN | 103259725 A | 8/2013 |
| CN | 104734929 A | 6/2015 |
| CN | 105337870 A | 2/2016 |
| CN | 106789748 A | 5/2017 |
| CN | 107026791 A | 8/2017 |
| CN | 107707474 A | 2/2018 |
| CN | 108234305 A | 6/2018 |
| EP | 2846498 A1 | 3/2015 |
| WO | 2018020293 A1 | 2/2018 |

\* cited by examiner

COMMUNICATION METHOD AND COMMUNICATIONS DEVICE

CROSS-REFERENCE TO RELATED APPLICATIONS

This application is a continuation of International Patent Application No. PCT/CN2019/102898 filed on Aug. 27, 2019, which claims priority to Chinese Patent Application No. 201811005412.9 filed on Aug. 30, 2018. The disclosures of the aforementioned applications are hereby incorporated by reference in their entireties.

TECHNICAL FIELD

This application relates to the field of communications technologies, and in particular, to a communication method and a communications device.

BACKGROUND

With an increasing quantity of network users and network routes, a sending device and a receiving device accordingly endure growing pressure. To relieve the pressure on the sending device and the receiving device, an outbound route filtering (ORF) protocol is generally defined by using RFC 4684 in a request for comments (RFC). In the ORF protocol, the sending device may send, to the receiving device through a border gateway protocol (BGP) update packet, a condition of a route expected to be received, and the receiving device sends, to the sending device, a route that is in a local routing table and that matches the condition in the update packet.

However, the receiving device usually finds a matched redundant route, and also sends the redundant route to the sending device. Consequently, a network bandwidth waste is caused, and processing capabilities of the sending device and the receiving device are weakened.

SUMMARY

This application provides a communication method and a communications device, to avoid transmitting a redundant route in each device, thereby reducing pressure of route transmission and route processing on each device.

According to a first aspect, this application provides a communication method, including the following.

A first device receives a first BGP update packet from a second device. The first BGP update packet includes a route target and a first address family identifier.

The first device determines a first route associated with the route target and the first address family identifier.

The first device sends the first route to the second device.

According to the communication method provided in the first aspect, an ORF protocol is extended because the second device adds a route target and an address family identifier to an update packet. Therefore, the first device can determine the first route associated with the route target and the first address family identifier. In this way, the first route forwarded by the first device to the second device is a route that the second device expects to receive. This implements precise route sending, resolves a problem that a redundant route is forwarded because a plurality of routes are matched only based on a route target, increases a device transmission rate, improves a device processing capability, and saves bandwidth resources.

In a possible design, that the first device determines a first route associated with the route target and the first address family identifier includes:

The first device determines first VRF associated with the route target and the first address family identifier.

The first device determines the first route based on the first VRF.

In a possible design, the first BGP update packet further includes a second address family identifier, and the method further includes the following.

The first device determines second VRF associated with the route target and the second address family identifier.

The first device determines a second route based on the second VRF.

The first device sends the second route to the second device.

According to the communication method provided in this implementation, a BGP update packet received by the first device may simultaneously carry route targets and address family identifiers of a plurality of routes that the second device expects to receive. Therefore, the first device may determine a route associated with a route target and an address family identifier, thereby implementing precise matching on a plurality of routes by the first device. In this way, the first device can send all matched routes to the second device, thereby avoiding forwarding a redundant route.

In a possible design, the method further includes the following.

After receiving the first BGP update packet, the first device stores an enabling mark associated with the first address family identifier. The enabling mark is used to indicate that a route in VRF associated with the first address family identifier is allowed to be sent.

Before the first device determines the first VRF associated with the route target and the first address family identifier, the first device determines, based on the enabling mark, that a route in the first VRF is allowed to be sent.

According to a second aspect, an embodiment of this application provides a communication method, including the following.

A second device sends a first BGP update packet to a first device. The first BGP update packet includes a route target and a first address family identifier, and the first BGP update packet is used to notify the first device that the second device needs a route associated with the route target and the first address family identifier.

The second device receives, from the first device, a first route associated with the route target and the first address family identifier.

According to the communication method provided in the second aspect, an ORF protocol is extended because the second device adds a route target and an address family identifier to an update packet. Therefore, the first device can determine the first route associated with the route target and the first address family identifier. In this way, the first route received by the second device from the first device is a route that the second device expects to receive, so that the second device can perform precise route processing. This resolves a problem that a redundant route is forwarded because a plurality of routes are matched only based on a route target, increases a device transmission rate, improves a device processing capability, and saves bandwidth resources.

In a possible design, the first BGP update packet further includes a second address family identifier, and the method further includes the following.

The second device receives, from the first device, a second route associated with the route target and the second address family identifier.

According to the communication method provided in this implementation, the second device may simultaneously send, to the first device, a route target and address family identifiers of a plurality of routes expected to be received, so that the first device separately determines the routes associated with the route target and the address family identifiers. In this way, the first device implements precise matching on the plurality of routes, so that the second device can separately receive, from the first device, routes found by the first device, and the second device can perform processing such as storage on the precisely matched routes. This reduces routing capacity pressure on the second device, and improves a processing capability of the second device.

In a possible design, the method further includes the following.

The second device stores an enabling mark associated with the first address family identifier.

The second device determines, based on the enabling mark, VRF associated with the first address family identifier.

The second device determines the route target based on the VRF.

According to a third aspect, an embodiment of this application provides a communications device, including an interface unit and a processing unit.

The interface unit is configured to receive a first BGP update packet from another communications device. The first BGP update packet includes a route target and a first address family identifier.

The processing unit is configured to determine a first route associated with the route target and the first address family identifier.

The interface unit is further configured to send the first route to the another communications device.

In a possible design, the processing unit is configured to: determine first VRF associated with the route target and the first address family identifier; and determine the first route based on the first VRF.

In a possible design, the processing unit is further configured to: when the first BGP update packet further includes a second address family identifier, determine second VRF associated with the route target and the second address family identifier; and determine a second route based on the second VRF.

The interface unit is further configured to send the second route to the another communications device.

In a possible design, the communications device further includes a memory.

The memory is configured to: after the interface unit receives the first BGP update packet, store an enabling mark associated with the first address family identifier. The enabling mark is used to indicate that a route in VRF associated with the first address family identifier is allowed to be sent.

The processing unit is further configured to: before the processing unit determines the first VRF associated with the route target and the first address family identifier, determine, based on the enabling mark, that a route in the first VRF is allowed to be sent.

For beneficial effects of the communications device provided in the third aspect and the possible designs of the third aspect, refer to the beneficial effects brought by the first aspect and the possible implementations of the first aspect. Details are not described herein again.

According to a fourth aspect, an embodiment of this application provides a communications device, including an interface unit.

The interface unit is configured to send a first BGP update packet to another communications device. The first BGP update packet includes a route target and a first address family identifier, and the first BGP update packet is used to notify the another communications device that the communications device needs a route associated with the route target and the first address family identifier.

The interface unit is configured to receive, from the another communications device, a first route associated with the route target and the first address family identifier.

In a possible design, the interface unit is further configured to: when the first BGP update packet further includes a second address family identifier, receive, from the another communications device, a second route associated with the route target and the second address family identifier.

In a possible design, the communications device further includes a processing unit and a memory.

The memory is configured to store an enabling mark associated with the first address family identifier.

The processing unit is configured to: determine, based on the enabling mark, VRF associated with the first address family identifier; and determine the route target based on the VRF.

For beneficial effects of the communications device provided in the fourth aspect and the possible designs of the fourth aspect, refer to the beneficial effects brought by the second aspect and the possible implementations of the second aspect. Details are not described herein again.

According to a fifth aspect, this application provides a first device, including: a receiving module, configured to receive a first BGP update packet from a second device, where the first BGP update packet includes a route target and a first address family identifier; a determining module, configured to determine a first route associated with the route target and the first address family identifier; and a sending module, configured to send the first route to the second device.

In a possible design, the determining module is configured to: determine first VRF associated with the route target and the first address family identifier; and determine the first route based on the first VRF.

In a possible design, the determining module is further configured to: when the first BGP update packet further includes a second address family identifier, determine second VRF associated with the route target and the second address family identifier; and determine a second route based on the second VRF.

The sending module is further configured to send the second route to the second device.

In a possible design, the first device further includes: a storage module, further configured to: after the receiving module receives the first BGP update packet, store an enabling mark associated with the first address family identifier, where the enabling mark is used to indicate that a route in VRF associated with the first address family identifier is allowed to be sent.

The determining module is further configured to: before determining the first VRF associated with the route target and the first address family identifier, determine, based on the enabling mark, that a route in the first VRF is allowed to be sent.

For beneficial effects of the communications device provided in the fifth aspect and the possible designs of the fifth aspect, refer to the beneficial effects brought by the first aspect and the possible implementations of the first aspect. Details are not described herein again.

According to a sixth aspect, this application provides a second device, including: a sending module, configured to send a first BGP update packet to a first device, where the first BGP update packet includes a route target and a first address family identifier, and the first BGP update packet is used to notify the first device that the second device needs a route associated with the route target and the first address family identifier; and a receiving module, configured to receive, from the first device, a first route associated with the route target and the first address family identifier.

In a possible design, the receiving module is further configured to: when the first BGP update packet further includes a second address family identifier, receive, from the first device, a second route associated with the route target and the second address family identifier.

In a possible design, the second device further includes: a storage module, configured to store an enabling mark associated with the first address family identifier; and a determining module, configured to determine, based on the enabling mark, VRF associated with the first address family identifier.

The determining module is further configured to determine the route target based on the VRF.

For beneficial effects of the communications device provided in the sixth aspect and the possible designs of the sixth aspect, refer to the beneficial effects brought by the second aspect and the possible implementations of the second aspect. Details are not described herein again.

According to a seventh aspect, this application provides a communications device, including a memory and a processor.

The memory is configured to store a program instruction.

The processor is configured to invoke the program instruction in the memory to perform the communications method according to the first aspect and any possible design of the first aspect.

According to an eighth aspect, this application provides a communications device, including a memory and a processor.

The memory is configured to store a program instruction.

The processor is configured to invoke the program instruction in the memory to perform the communications method according to the second aspect and any possible design of the second aspect.

According to a ninth aspect, this application provides a readable storage medium. The readable storage medium stores an executable instruction. When at least one processor in a communications device executes the executable instruction, the communications device performs the communication method according to the first aspect and any possible design of the first aspect.

According to a tenth aspect, this application provides a readable storage medium. The readable storage medium stores an executable instruction. When at least one processor in a communications device executes the executable instruction, the communications device performs the communication method according to the second aspect and any possible design of the second aspect.

According to an eleventh aspect, this application provides a program product. The program product includes an executable instruction, and the executable instruction is stored in a readable storage medium. At least one processor in a communications device may read the executable instruction from the readable storage medium. The at least one processor executes the executable instruction, so that the communications device is enabled to perform the communication method according to the first aspect and any possible design of the first aspect.

According to a twelfth aspect, this application provides a program product. The program product includes an executable instruction, and the executable instruction is stored in a readable storage medium. At least one processor in a communications device may read the executable instruction from the readable storage medium. The at least one processor executes the executable instruction, so that the communications device is enabled to perform the communication method according to the second aspect and any possible design of the second aspect.

According to a thirteenth aspect, this application provides a chip. The chip is connected to a memory, or the chip is integrated with a memory. A software program stored in the memory is executed to implement the communication method according to the first aspect and any possible design of the first aspect or the communication method according to the second aspect and any possible design of the second aspect.

According to a fourteenth aspect, this application provides a system, including the communications device provided in the third aspect and any possible design of the third aspect and the communications device provided in the fourth aspect and any possible design of the fourth aspect.

According to the communication method and the communications device provided in embodiments of this application, the BGP update packet sent by the second device to the first device not only includes the route target associated with a route expected to be received, but also includes the first address family identifier associated with the route, so that the first device can determine the first route associated with the route target and the first address family identifier. In this way, the first route forwarded by the first device to the second device is a route that the second device expects to receive. In the embodiments of this application, the ORF protocol is extended by adding a route target and an address family identifier to an update packet. This implements precise route sending, resolves a problem that a redundant route is forwarded because a plurality of routes are matched only based on a route target, increases a device transmission rate, improves a device processing capability, saves bandwidth resources, and reduces routing capacity pressure on a device.

DETAILED DESCRIPTION OF ILLUSTRATIVE EMBODIMENTS

Figure 1:
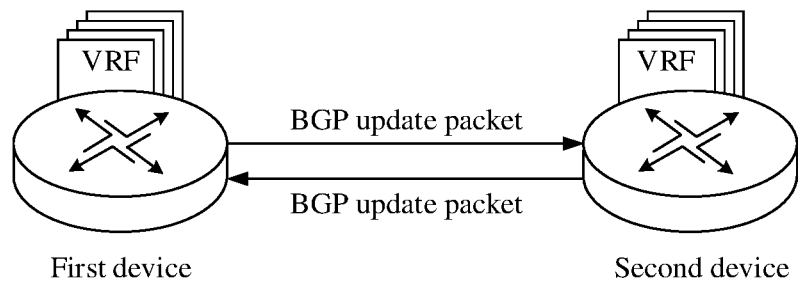
FIG. 1 is a schematic diagram of a communications system according to an embodiment of this application.

FIG. 1 is a schematic diagram of a communications system according to an embodiment of this application. As shown in FIG. 1, the communications system includes a first device and a second device. In an ORF protocol, the first device may receive a BGP update packet from the second device. The update packet includes an inbound policy of the second device, and the inbound policy usually includes conditions of one or more virtual private network (VPN) routes. The first device applies the conditions to an outbound policy of the first device, and performs matching on locally stored VPN routes based on the update packet. If there is a matched VPN route, the first device sends a BGP update packet to the second device, and each BGP update packet may include one or more matched VPN routes. If there is no VPN route, no BGP update packet is sent by the first device to the second device. Therefore, the first device sends only a matched route to the second device.

Alternatively, the first device may serve as a sender, and correspondingly the second device serves as a receiver. The first device sends an inbound policy of the first device to the second device, so that the second device can implement local route matching based on the inbound policy of the first device. For a specific process, refer to the foregoing implementation content. Details are not described herein again.

The first device and the second device mentioned in the embodiments of this application may be any physical device or virtual device having a packet sending function, a packet receiving function, and a route matching function. For example, the first device and the second device may be access routers (AR) or provider edge (PE) devices. The first device and the second device may alternatively be intra-domain route reflectors (RR) or inter-domain autonomous system boundary routers (ASBR).

Further, a route target (RT) is used for VPN route distribution and installation policies. The RT is manually configured and is globally unique in a same address family. For example, in a VPNv4 address family, if an RT of a VPN 1 route may be set to 100:1, an RT of a VPN 2 route may not be set to 100:1, but may be set to 200:1. For ease of description, an example in which the first device serves as a receiver and the second device serves as a sender is used below.

Still referring to FIG. 1, the BGP update packet sent by the second device to the first device carries an RT of an expected VPN route. Therefore, the first device may search a plurality of pieces of locally stored virtual routing and forwarding (VRF) for an RT that is the same as the RT. If the same RT is found, a VPN route in VRF including the same RT is determined as a matched VPN route. If no corresponding RT is found, there is no matched VPN route. This implements RT based VPN route matching.

Both the first device and the second device may include a plurality of pieces of VRF. Each piece of VRF may include a routing table (which may also be referred to as a virtual routing table). Each piece of VRF may be associated with one or more attributes. For example, each piece of VRF may include the one or more attributes. The attribute may be, for example, an RT, an address family identifier, or a VRF name. A plurality of pieces of VRF may be associated with one RT. A communications device may find a plurality of pieces of matched VRF based on one RT, and the plurality of pieces of VRF are associated with different address families. When the first device performs VPN route matching based on an RT, the first device is very likely to find a plurality of matched VPN routes in VRF associated with the RT. The plurality of VPN routes not only include a VPN route that the second device expects to receive, but also include a VPN route that the second device does not expect to receive. However, the first device sends all the matched VPN routes to the second device. In this case, a redundant VPN route is also sent by the first device to the second device. Consequently, sending pressure on the first device and receiving pressure on the second device are increased, and a network bandwidth waste is easily caused, increasing routing capacity pressure of the second device and weakening a processing capability of the second device.

Figure 2:
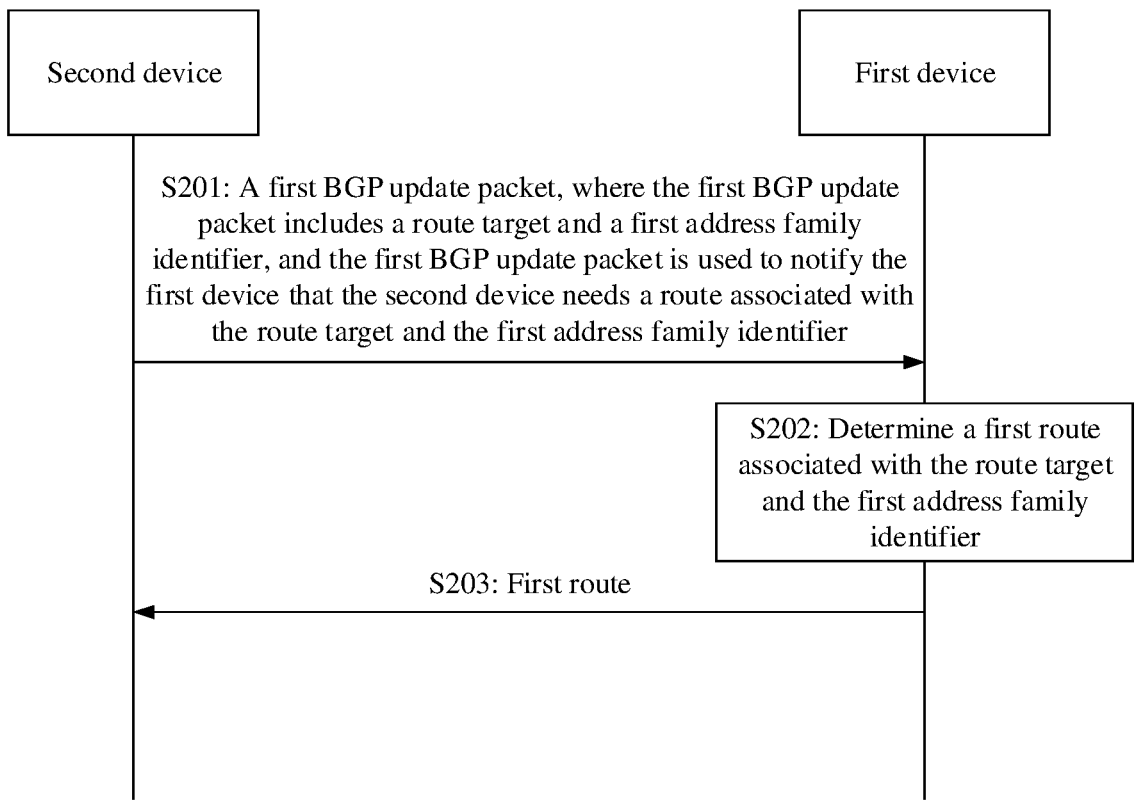
FIG. 2 is a signaling flowchart of a communication method according to an embodiment of this application.

Considering the foregoing problem, the embodiments of this application provide a communication method and a communications device, so as to implement precise route forwarding, thereby resolving a prior-art problem that a network bandwidth waste is caused and a device processing capability is weakened because a plurality of routes are sent. Referring to FIG. 2, the following describes in detail a specific implementation process of the communication method in the embodiments of this application.

FIG. 2 is a signaling flowchart of a communication method according to an embodiment of this application. As shown in FIG. 2, the communication method in this embodiment may include the following steps:

S201: A second device sends a first BGP update packet to a first device, where the first BGP update packet includes a route target and a first address family identifier, and the first BGP update packet is used to notify the first device that the second device needs a route associated with the route target and the first address family identifier.

S202: The first device determines a first route associated with the route target and the first address family identifier.

S203: The first device sends the first route to the second device.

In this embodiment of this application, an address family identifier is a new extended community attribute in a BGP update packet. The address family identifier may indicate an address family having a capability of enabling an ORF protocol, and is used to distinguish a type of an address family used by an RT corresponding to a VPN route. Generally, the address family identifier includes but is not limited to a form of an attribute value. A general format of the attribute value is: one or more address family identifiers (AFI):subsequent address family identifier (SAFI), for example, a value 25:65, a value 1:128, or a value 1:5.

For example, the value 25:65 may indicate a layer 2 VPN (L2VPN) virtual private local area network service (VPLS) address family. For the L2VPN VPLS address family, for example, refer to descriptions in RFC 4761, and the L2VPN VPLS address family is referred to as L2-AD-FAMILY for short below. The value 1:128 may indicate a VPN based internet protocol version 4 (VPN-IPv4) address family. For the VPN-IPv4 address family, for example, refer to descriptions in RFC 4364, and the VPN-IPv4 address family is referred to as L3VPNv4-FAMILY for short below. The value 1:5 may indicate a multicast VPN (Multicast VPN, MCAST-VPN) address family. For the MCAST-VPN address family, for example, refer to descriptions in RFC 6514, and the MCAST-VPN address family is referred to as MVPN for short below.

In this embodiment of this application, the address family identifier may indicate a type of an address family used by an RT corresponding to a VPN route. Therefore, to avoid a case in which one RT corresponds to redundant VPN routes, the first BGP update packet sent by the second device to the first device not only carries the RT corresponding to the VPN route, but also carries the first address family identifier. Therefore, when receiving the RT and the first address family identifier, the first device may determine only the first route associated with the RT and the first address family identifier, and the first device may further send the first route to the second device in a form of a BGP update packet. This reduces a data amount used by the first device to send a VPN route to the second device, increases a rate at which the second device receives a VPN route, and increases a rate at which the second device processes a received VPN route.

In addition, after receiving the first route from the first device, the second device may correspondingly process the received first route. Compared with the current technology in which the second device needs to process a redundant route associated with an address family that is not required, in this embodiment of this application, the second device may process only a precisely matched route found by the first device, thereby improving a processing capability of the second device, and reducing routing capacity pressure on the second device.

According to the communication method provided in this embodiment of this application, the BGP update packet sent by the second device to the first device not only includes a route target associated with a route expected to be received, but also includes the first address family identifier associated with the route. Therefore, the first device can determine the first route associated with the route target and the first address family identifier. In this way, the first route forwarded by the first device to the second device is a route that the second device expects to receive. In this embodiment of this application, the ORF protocol is extended because a route target and an address family identifier are added to an update packet. This implements precise route forwarding, resolves a problem that a redundant route is forwarded because a plurality of routes are matched only based on a route target, increases a device transmission rate, improves a device processing capability, saves bandwidth resources, and reduces routing capacity pressure on a device.

For example, based on the embodiment shown in FIG. 2, in a specific implementation of S202, optionally, the first device determines first VRF associated with the RT and the first address family identifier, and the first device determines the first route based on the first VRF.

In this embodiment of this application, each piece of VRF in the first device may store an RT and an address family identifier. Therefore, the first device may search locally stored pieces of VRF based on the received RT and the received first address family identifier, to determine whether there is stored VRF that is the same as, or that corresponds to, or that is associated with the received RT and the received first address family identifier, and then determine that the VRF that is the same as, or that corresponds to, or that is associated with the received RT and the received first address family identifier is the first VRF that is associated with the RT and the first address family identifier, so that the first device can determine the first route based on the first VRF.

In addition, both the first device and the second device may store an enabling mark used to indicate that a route in VRF associated with an address family identifier is allowed to be sent. When an enabling mark that is stored by the first device or the second device and that corresponds to an address family identifier A is "Enable", the first device or the second device may determine that a VPN route in VRF associated with the address family identifier A is allowed to be sent; or when the first device or the second device does not store an enabling mark corresponding to an address family identifier A or when an enabling mark that is stored by the first device or the second device and that corresponds to the address family identifier A and is "Disenable", the first device or the second device may determine that a VPN route in VRF associated with the address family identifier A is not allowed to be sent. A specific form of the enabling mark is not limited in this embodiment of this application.

Further, the first device and the second device may determine, based on the enabling mark, an address family identifier corresponding to the enabling mark, and then determine, from a plurality of pieces of locally stored VRF, VRF that is associated with (that is the same as or that corresponds to) the address family identifier, to determine whether to send a VPN route expected to be received or a matched VPN route.

In this embodiment of this application, before the second device sends the BGP update packet including the route target and the first address family identifier to the first device, the second device needs to determine the RT and the first address family identifier. Because the enabling mark is used to indicate that a route in VRF associated with an address family identifier is allowed to be sent, the second device may determine, based on the locally stored enabling mark associated with the first address family identifier, VRF associated with the first address family identifier, and then determine the RT based on the VRF, so that the second device can quickly and accurately determine the RT and the first address family identifier based on the enabling mark, thereby completing a process in which the second device sends the first BGP update packet carrying the RT and the first address family identifier to the first device.

In addition, in this embodiment of this application, after the first device receives the first BGP update packet, because the enabling mark is used to indicate that a route in VRF associated with an address family identifier is allowed to be sent, the first device may store the enabling mark associated with the first address family identifier, so that the first device can determine, based on the stored enabling mark, that a route in the first VRF is allowed to be sent. Therefore, when the first device finds, from locally stored VRF, the first VRF that matches the received RT and the received first address family identifier, the first device may send the first route corresponding to the first VRF to the second device.

In the embodiment shown in FIG. 2, the first device may perform route matching based on the first BGP update packet that carries only one RT and one address family identifier, and the first device may further perform route matching based on the first BGP update packet that carries one RT and a plurality of address family identifiers. For ease of description, with reference to FIG. 3, an example in which the first BGP update packet includes one RT and two address family identifiers is used to describe in detail a specific implementation process of the communication method in this application.

Figure 3:
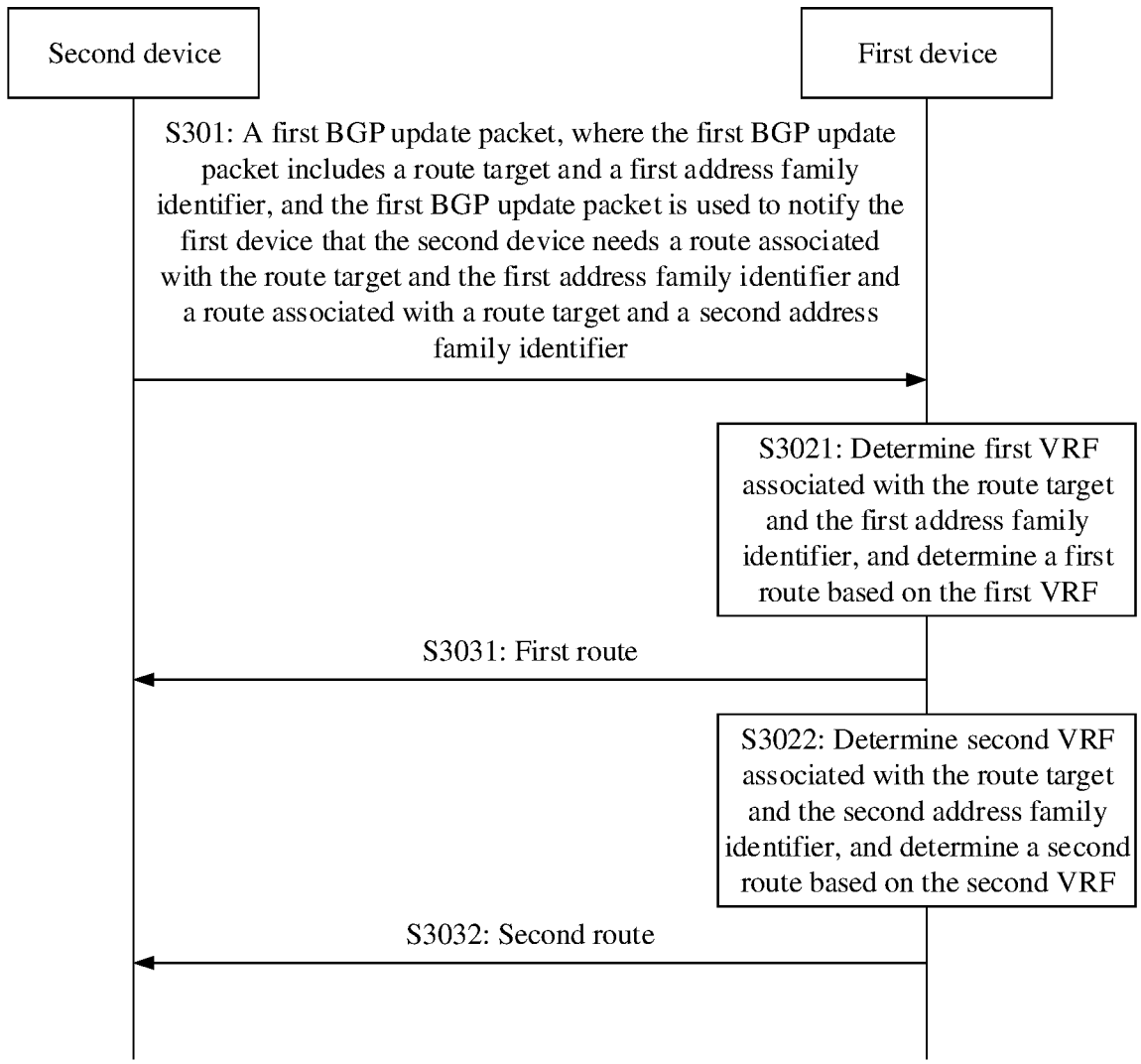
FIG. 3 is a signaling flowchart of a communication method according to an embodiment of this application.

FIG. 3 is a signaling flowchart of a communication method according to an embodiment of this application. As shown in FIG. 3, the communication method in this embodiment may include the following steps.

S301: A second device sends a first BGP update packet to a first device, where the first BGP update packet includes a route target and a first address family identifier, and the first BGP update packet is used to notify the first device that the second device needs a route associated with the route target and the first address family identifier and a route associated with the route target and a second address family identifier.

In this embodiment of this application, the first BGP update packet sent by the second device to the first device may simultaneously carry conditions of two routes that the second device expects to receive. One condition includes an RT and one address family identifier, and the other condition includes an RT and another address family identifier. S301 is similar to a specific implementation of S201 in the embodiment in FIG. 2, and details are not described herein again in this embodiment.

S3021: The first device determines first VRF associated with the route target and the first address family identifier, and determines a first route based on the first VRF.

In this embodiment of this application, the first device may search locally stored pieces of VRF based on the received RT and the received first address family identifier, to determine whether there is stored VRF that is the same as, or that corresponds to, or that is associated with the received RT and the received first address family identifier, and then determine the first route based on the first VRF that is the same as, or that corresponds to, or that is associated with the received RT and the received first address family identifier.

S3022: The first device determines second VRF associated with the route target and the second address family identifier, and determines a second route based on the second VRF.

In this embodiment of this application, the first device may search the locally stored pieces of VRF based on the received RT and the received second address family identifier, to determine whether there is stored VRF that is the same as, or that corresponds to, or that is associated with the received RT and the received second address family identifier, and then determine the second route based on the second VRF that is the same as, or that corresponds to, or that is associated with the received RT and the received second address family identifier.

It should be noted that there is no sequence between S3021 and S3022. To be specific, S3021 and S3022 may be simultaneously performed, or may be performed in sequence.

S3031: The first device sends the first route to the second device.

S3032: The first device sends the second route to the second device.

S3031 and S3032 are separately similar to a specific implementation of S203 in the embodiment in FIG. 2, and details are not described herein again in this embodiment. In S3031 and S3032, two BGP update packets may be used to respectively send the first route and the second route. It should be noted that there is no sequence between S3031 and S3032. To be specific, S3031 and S3032 may be simultaneously performed, or may be performed in sequence.

In this embodiment of this application, the second device may simultaneously send route targets and a plurality of address family identifiers to the first device. Therefore, the first device determines a route associated with a route target and each address family identifier, thereby implementing precise matching on a plurality of routes by the first device. In this way, the first device can send all matched routes to the second device, thereby avoiding forwarding a redundant route, and the second device can perform processing such as storage on the precisely matched routes. This reduces routing capacity pressure on the second device, and improves a processing capability of the second device.

Figure 4:
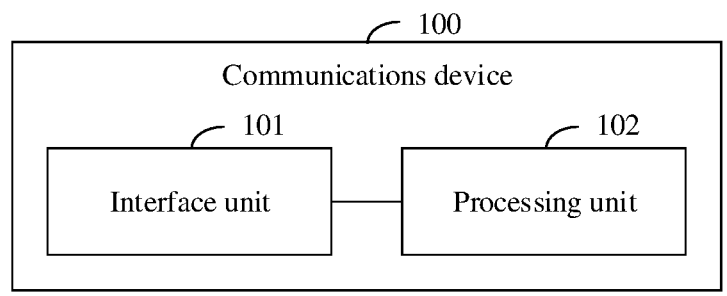
FIG. 4 is a schematic structural diagram of a communications device according to an embodiment of this application.

For example, an embodiment of this application further provides a communications device. FIG. 4 is a schematic structural diagram of a communications device 100 according to an embodiment of this application. As shown in FIG. 4, the communications device 100 may be any physical device or virtual device having a packet sending function, a packet receiving function, and a route matching function, for example, an AR, a PE, an intra-domain RR, or an inter-domain ASBR. The communications device 100 is configured to implement an operation corresponding to the first device in any one of the foregoing method embodiments. The communications device 100 in this embodiment of this application may include an interface unit 101 and a processing unit 102. The interface unit 101 is, for example, a port module, and may communicate with another device through an optical port, an electrical port, or a combination thereof. The processing unit 102 may be a processor, an integrated circuit, a field-programmable gate array (field-programmable gate array, FPGA), a chip, or the like.

The interface unit 101 is configured to receive a first BGP update packet from another communications device. The first BGP update packet includes a route target and a first address family identifier.

The processing unit 102 is configured to determine a first route associated with the route target and the first address family identifier.

The interface unit 101 is further configured to send the first route to the another communications device.

In some embodiments, the processing unit 102 is configured to: determine first VRF associated with the route target and the first address family identifier; and determine the first route based on the first VRF.

In some embodiments, the processing unit 102 is further configured to: when the first BGP update packet further includes a second address family identifier, determine second VRF associated with the route target and the second address family identifier; and determine a second route based on the second VRF.

The interface unit 101 is further configured to send the second route to the another communications device.

Figure 5:
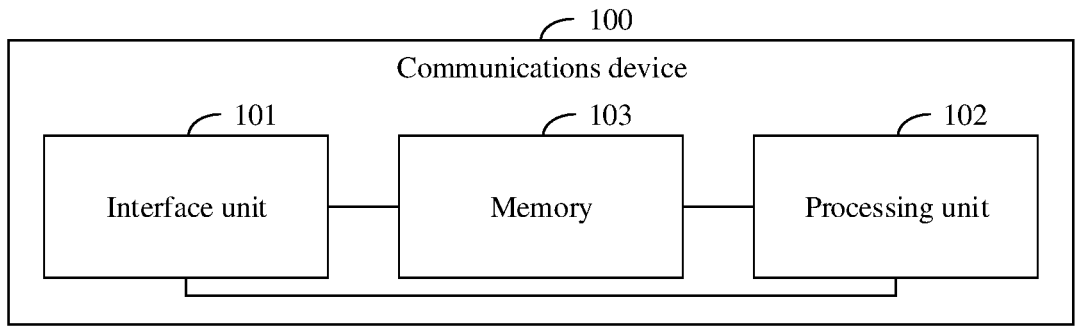
FIG. 5 is a schematic structural diagram of a communications device according to an embodiment of this application.

FIG. 5 is a schematic structural diagram of a communications device according to an embodiment of this application. As shown in FIG. 5, based on the structure shown in FIG. 4, the communications device in this embodiment of this application may further include a memory 103. The memory 103 may be a volatile memory such as a RAM, or may be a nonvolatile memory such as a ROM.

The memory 103 is configured to: after the interface unit 101 receives the first BGP update packet, store an enabling mark associated with the first address family identifier. The enabling mark is used to indicate that a route in VRF associated with the first address family identifier is allowed to be sent.

The processing unit 102 is further configured to: before the processing unit 102 determines the first VRF associated with the route target and the first address family identifier, determine, based on the enabling mark, that a route in the first VRF is allowed to be sent.

The communications device in this embodiment of this application may be configured to execute the technical solutions executed by the first device in the foregoing method embodiment. Implementation principles and technical effects thereof are similar, and details are not described herein again.

Figure 6:
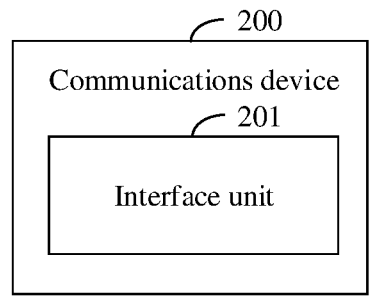
FIG. 6 is a schematic structural diagram of a communications device according to an embodiment of this application.

For example, an embodiment of this application further provides a communications device. FIG. 6 is a schematic structural diagram of a communications device according to an embodiment of this application. As shown in FIG. 6, the communications device 200 may be any physical device or virtual device having a packet sending function, a packet receiving function, and a route matching function, for example, an AR, a PE, an intra-domain RR, or an inter-domain ASBR. The communications device 200 is configured to implement an operation corresponding to the second device in any one of the foregoing method embodiments. The communications device 200 in this embodiment of this application may include an interface unit 201. The interface unit 201 is, for example, a port module, and may communicate with another device through an optical port, an electrical port, or a combination thereof.

The interface unit 201 is configured to send a first BGP update packet to another communications device. The first BGP update packet includes a route target and a first address family identifier, and the first BGP update packet is used to notify the another communications device that the communications device needs a route associated with the route target and the first address family identifier.

The interface unit 201 is configured to receive, from the another communications device, a first route associated with the route target and the first address family identifier.

In some embodiments, the interface unit 201 is further configured to: when the first BGP update packet further includes a second address family identifier, receive, from the another communications device, a second route associated with the route target and the second address family identifier.

Figure 7:
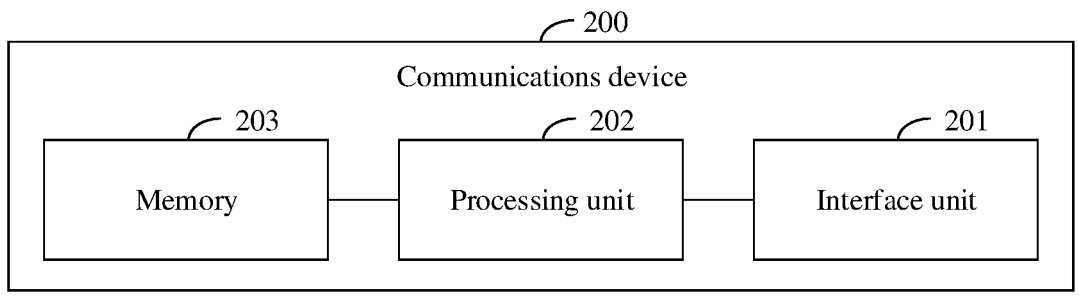
FIG. 7 is a schematic structural diagram of a communications device according to an embodiment of this application.

FIG. 7 is a schematic structural diagram of a communications device according to an embodiment of this application. As shown in FIG. 7, based on the structure shown in FIG. 6, the communications device 200 in this embodiment of this application may further include a processing unit 202 and a memory 203. The processing unit 202 may be a processor, an integrated circuit, a field-programmable gate array (field-programmable gate array, FPGA), a chip, or the like. The memory 203 may be a volatile memory such as a RAM, or may be a nonvolatile memory such as a ROM.

The memory 203 is configured to store an enabling mark associated with the first address family identifier.

The processing unit 202 is configured to: determine, based on the enabling mark, VRF associated with the first address family identifier; and determine the route target based on the VRF.

The communications device in this embodiment of this application may be configured to execute the technical solutions executed by the second device in the foregoing method embodiment. Implementation principles and technical effects thereof are similar, and details are not described herein again.

Figure 8:
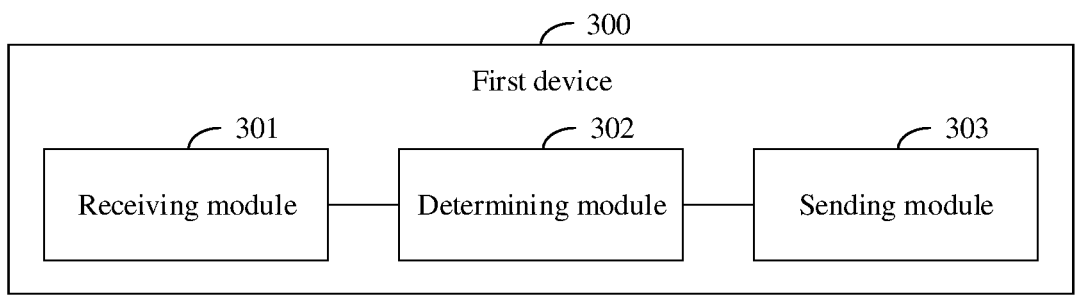
FIG. 8 is a schematic structural diagram of a first device according to an embodiment of this application.

For example, an embodiment of this application further provides a first device. FIG. 8 is a schematic structural diagram of a first device 300 according to an embodiment of this application. As shown in FIG. 8, the first device 300 may be any physical device or virtual device having a packet sending function, a packet receiving function, and a route matching function, for example, an AR, a PE, an intra-domain RR, or an inter-domain ASBR. The first device 300 is configured to perform an operation corresponding to the first device in any one of the foregoing method embodiments. The first device 300 in this embodiment of this application may include: a receiving module 301, configured to receive a first BGP update packet from a second device, where the first BGP update packet includes a route target and a first address family identifier; a determining module 302, configured to determine a first route associated with the route target and the first address family identifier; and a sending module 303, configured to send the first route to the second device.

In some embodiments, the determining unit 302 is configured to: determine first VRF associated with the route target and the first address family identifier; and determine the first route based on the first VRF.

In some embodiments, the determining module 302 is further configured to: when the first BGP update packet further includes a second address family identifier, determine second VRF associated with the route target and the second address family identifier; and determine a second route based on the second VRF.

The sending module 303 is further configured to send the second route to the second device.

Figure 9:
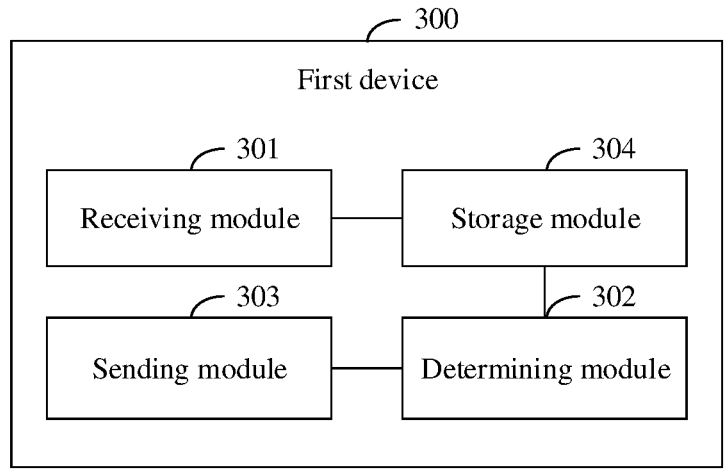
FIG. 9 is a schematic structural diagram of a first device according to an embodiment of this application.

FIG. 9 is a schematic structural diagram of a first device according to an embodiment of this application. As shown in FIG. 9, based on the structure shown in FIG. 8, the first device 300 in this embodiment of this application may further include: a storage module 304, configured to: after the receiving module 301 receives the first BGP update packet, store an enabling mark associated with the first address family identifier, where the enabling mark is used to indicate that a route in VRF associated with the first address family identifier is allowed to be sent.

The determining module 302 is further configured to: before determining the first VRF associated with the route target and the first address family identifier, determine, based on the enabling mark, that a route in the first VRF is allowed to be sent.

The first device in this embodiment of this application may be configured to execute the technical solutions in the foregoing method embodiment. Implementation principles and technical effects thereof are similar, and details are not described herein again.

Figure 10:
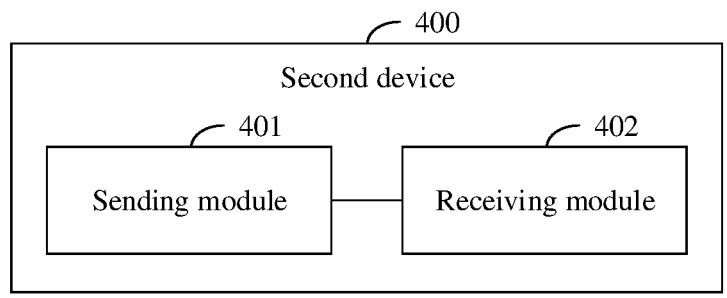
FIG. 10 is a schematic structural diagram of a second device according to an embodiment of this application.

For example, an embodiment of this application further provides a second device. FIG. 10 is a schematic structural diagram of a second device 400 according to an embodiment of this application. As shown in FIG. 10, the second device 400 may be any physical device or virtual device having a packet sending function, a packet receiving function, and a route matching function, for example, an AR, a PE, an intra-domain RR, or an inter-domain ASBR. The second device 400 is configured to perform an operation corresponding to the second device in any one of the foregoing method embodiments. The second device 400 in this embodiment of this application may include: a sending module 401, configured to send a first BGP update packet to a first device, where the first BGP update packet includes a route target and a first address family identifier, and the first BGP update packet is used to notify the first device that the second device needs a route associated with the route target and the first address family identifier; and a receiving module 402, configured to receive, from the first device, a first route associated with the route target and the first address family identifier.

In some embodiments, the receiving module 402 is further configured to: when the first BGP update packet further includes a second address family identifier, receive, from the first device, a second route associated with the route target and the second address family identifier.

Figure 11:
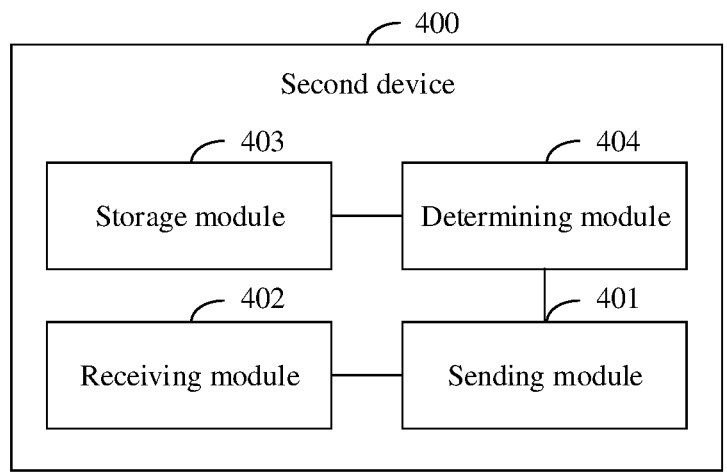
FIG. 11 is a schematic structural diagram of a second device according to an embodiment of this application.

FIG. 11 is a schematic structural diagram of a second device according to an embodiment of this application. As shown in FIG. 11, based on the structure shown in FIG. 10, the second device 400 in this embodiment of this application may further include: a storage module 403, configured to store an enabling mark associated with the first address family identifier; and a determining module 404, configured to determine, based on the enabling mark, VRF associated with the first address family identifier.

The determining module 404 is further configured to determine the route target based on the VRF.

The second device in this embodiment of this application may be configured to execute the technical solutions in the foregoing method embodiment. Implementation principles and technical effects thereof are similar, and details are not described herein again.

Figure 12:
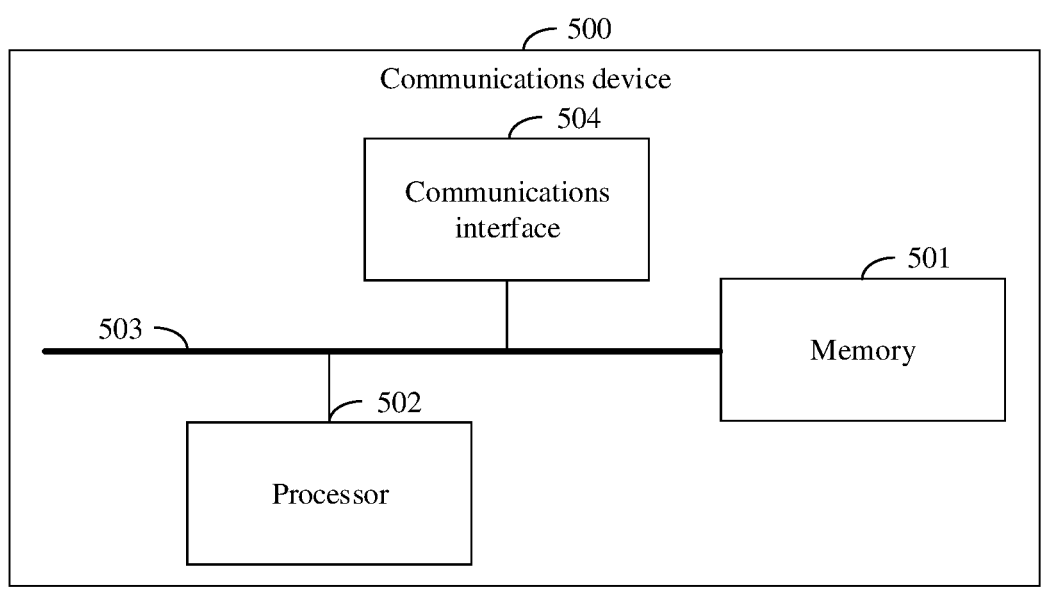
FIG. 12 is a schematic diagram of a hardware structure of a communications device according to an embodiment of this application.

FIG. 12 is a schematic diagram of a hardware structure of a communications device 500 according to an embodiment of this application. As shown in FIG. 12, the communications device 500 may be any physical device or virtual device having a packet sending function, a packet receiving function, and a route matching function, for example, an AR, a PE, an intra-domain RR, or an inter-domain ASBR. The communications device 500 is configured to implement an operation corresponding to the first device or the second device in any one of the foregoing method embodiments. The communications device 500 in this embodiment of this application may include: a memory 501 and a processor 502. The memory 501 and the processor 502 may be connected by using a bus 503.

The memory 501 is configured to store program code.

The processor 502 invokes the program code. When the program code is executed, the processor 502 is configured to perform the communication method in any one of the foregoing embodiments. For details, refer to related descriptions in the foregoing method embodiment.

Optionally, this embodiment of this application further includes a communications interface 504. The communications interface 504 may be connected to the processor 502 by using the bus 503. The processor 502 may control the communications interface 503 to implement the foregoing receiving and sending functions of the communications device 500.

The communications device in this embodiment of this application may be configured to execute the technical solutions in the foregoing method embodiment. Implementation principles and technical effects thereof are similar, and details are not described herein again.

In the several embodiments provided in this application, it should be understood that the disclosed device and method may be implemented in another manner. For example, the described device embodiment is merely an example. For example, the module division is merely logical function division and may be other division during actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatus or the modules may be implemented in electrical, mechanical, or other forms.

The modules described as separate parts may or may not be physically separate, and parts displayed as modules may or may not be physical units, may be located in one position, or may be distributed on a plurality of network units. Some or all of the modules may be selected according to actual requirements to achieve the objectives of the solutions of the embodiments of this application.

In addition, function modules in the embodiments of this application may be integrated into one processing unit, or the modules may exist alone physically, or two or more modules are integrated into one module. The unit into which the modules are integrated may be implemented in a form of hardware, or may be implemented in a form of hardware and a software functional unit.

The foregoing integrated module implemented in a form of a software functional module may be stored in a computer-readable storage medium. The software functional module is stored in a storage medium and includes several instructions for enabling a computer device (which may be a personal computer, a server, a network device, or the like) or a processor (processor) to perform some steps of the methods described in the embodiments of this application.

It should be understood that the processor may be a central processing unit (CPU), or may be another general-purpose processor, a digital signal processor (DSP), an application-specific integrated circuit (ASIC), or the like. The general-purpose processor may be a microprocessor, or may be any conventional processor, or the like. The steps of the methods disclosed with reference to the present invention may be directly performed by a hardware processor, or may be performed through a combination of hardware of the processor and a software module.

The memory may include a high-speed RAM, or may include a nonvolatile memory NVM, for example, at least one magnetic disk storage, or may be a USB flash drive, a removable hard disk, a read-only memory, a magnetic disk, an optical disc, or the like.

The bus may be an industrial standard architecture (industrial standard architecture, ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

All or some of the foregoing embodiments may be implemented through software, hardware, firmware, or any combination thereof. When the software is used to implement the embodiments, the embodiments may be implemented all or partially in a form of a computer program product. The computer program product includes one or more computer instructions. When the computer program instructions are loaded and executed on a computer, the procedures or the functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
receiving, by a first device, a first border gateway protocol (BGP) update packet from a second device, wherein the first BGP update packet comprises a route target and a first address family identifier;
determining, by the first device based on the route target and the first address family identifier, a first virtual routing and forwarding (VRF) piece associated with the route target and the first address family identifier, wherein a plurality of VRF pieces are stored on the first device, and each VRF piece of the plurality of VRF pieces is associated with a corresponding route target and an address family identifier;
determining, by the first device based on the first VRF piece, a first route associated with the route target and the first address family identifier; and
sending, by the first device, information of the first route to the second device.

2. The method according to claim 1, wherein the first BGP update packet further comprises a second address family identifier, and the method further comprises:
determining, by the first device, a second VRF piece associated with the route target and the second address family identifier;
determining, by the first device, a second route based on the second VRF piece; and
sending, by the first device, information of the second route to the second device.

3. The method according to claim 1, further comprising:
after receiving the first BGP update packet, storing, by the first device, an enabling mark associated with the first address family identifier, wherein the enabling mark indicates that a route in the first VRF piece associated with the first address family identifier is allowed to be sent; and
before the first device determines the first VRF piece associated with the route target and the first address family identifier, determining, by the first device based on the enabling mark, that a route in the first VRF piece is allowed to be sent.

4. A method, comprising:
sending, by a second device, a first border gateway protocol (BGP) update packet to a first device, wherein the first BGP update packet comprises a route target and a first address family identifier, and the first BGP update packet notifies the first device that the second device requests a route associated with the route target and the first address family identifier, and wherein each virtual routing and forwarding (VRF) piece of a plurality of VRF pieces is associated with a corresponding route target and address family identifier, a first VRF piece is associated with the route target and the first address family identifier, and the first VRF piece is usable to identify a first route associated with the route target and the first address family identifier; and
receiving, by the second device from the first device, information of the first route associated with the route target and the first address family identifier.

5. The method according to claim 4, wherein the first BGP update packet further comprises a second address family identifier, and the method further comprises:
receiving, by the second device from the first device, information of a second route associated with the route target and the second address family identifier.

6. The method according to claim 4, further comprising:
storing, by the second device, an enabling mark associated with the first address family identifier;
determining, by the second device based on the enabling mark, a virtual routing and forwarding (VRF) piece associated with the first address family identifier; and
determining, by the second device, the route target based on the VRF piece.

7. A device, comprising:
an interface;
a processor;
a computer readable storage medium storing a program that is executable by the processor;
wherein the interface is configured to receive a first border gateway protocol (BGP) update packet from another device, wherein the first BGP update packet comprises a route target and a first address family identifier;
wherein the program includes instructions for:
determining, based on the route target and the first address family identifier, a first virtual routing and forwarding virtual routing and forwarding (VRF) piece associated with the route target and the first address family identifier, wherein a plurality of VRF pieces are stored on the device, and each VRF piece is associated with a corresponding route target and an address family identifier; and
determining, based on the first VRF piece, a first route associated with the route target and the first address family identifier; and
wherein the interface is further configured to send information of the first route to the another device.

8. The device according to claim 7, wherein the program further includes instructions for:
when the first BGP update packet further comprises a second address family identifier, determining a second VRF piece associated with the route target and the second address family identifier; and
determining a second route based on the second VRF; and
wherein the interface is further configured to send information of the second route to the another device.

9. The device according to claim 7, wherein the program further includes instructions for:
after the interface receives the first BGP update packet, store, in the storage medium, an enabling mark associated with the first address family identifier, wherein the enabling mark indicates that a route in the first VRF piece associated with the first address family identifier is allowed to be sent; and
before determining the first VRF piece associated with the route target and the first address family identifier, determine, based on the enabling mark, that a route in the first VRF piece is allowed to be sent.

10. The device according to claim 7, wherein the program further includes instructions for:
storing, in the storage medium, an enabling mark associated with the first address family identifier;

determining, based on the enabling mark, the first VRF piece associated with the first address family identifier; and determining the route target based on the first VRF piece associated with the first address family identifier.

11. A device, comprising:

an interface, configured to:

send a first border gateway protocol (BGP) update packet to another device, wherein the first BGP update packet comprises a route target and a first address family identifier, and the first BGP update packet notifies the another device that the device requests a route associated with the route target and the first address family identifier, and wherein each virtual routing and forwarding (VRf) piece of a plurality of VRF pieces is associated with a corresponding route target and address family identifier, a first VRF piece is associated with the route target and the first address family identifier, and the first VRF piece is usable to identify a first route associated with the route target and the first address family identifier; and receive, from the another device, information of the first route associated with the route target and the first address family identifier.

12. The device according to claim 11, wherein the interface is further configured to: when the first BGP update packet further comprises a second address family identifier, receive, from the another device, information of a second route associated with the route target and the second address family identifier.

13. The device according to claim 12, further comprising:

a processor; and a computer readable storage medium storing a program that is executable by the processor, wherein the program includes instructions for:

storing an enabling mark associated with the first address family identifier;

determining, based on the enabling mark, the first VRF piece associated with the first address family identifier; and determining the route target based on the VRF piece.

14. The device according to claim 11, further comprising:

a processor; and a non-transitory computer readable storage medium storing a program that is executable by the processor, wherein the program includes instructions for storing, in the storage medium, an enabling mark associated with the first address family identifier;

determining, based on the enabling mark, the first piece associated with the first address family identifier; and determining the route target based on the VRF piece.

* * * * *

UNITED STATES PATENT AND TRADEMARK OFFICE
CERTIFICATE OF CORRECTION

| | |
|---|---|
| PATENT NO. | : 11,805,049 B2 |
| APPLICATION NO. | : 17/186776 |
| DATED | : October 31, 2023 |
| INVENTOR(S) | : Sun et al. |

It is certified that error appears in the above-identified patent and that said Letters Patent is hereby corrected as shown below:

In the Claims

In Column 18, in Claim 7, Line 32, before "(VRF)" delete "virtual routing and forwarding".

In Column 19, in Claim 11, Line 15, delete "(VRf)" and insert -- (VRF) --.

Signed and Sealed this
Second Day of January, 2024

Katherine Kelly Vidal
*Director of the United States Patent and Trademark Office*